United States Patent Office 2,864,244
Patented Dec. 16, 1958

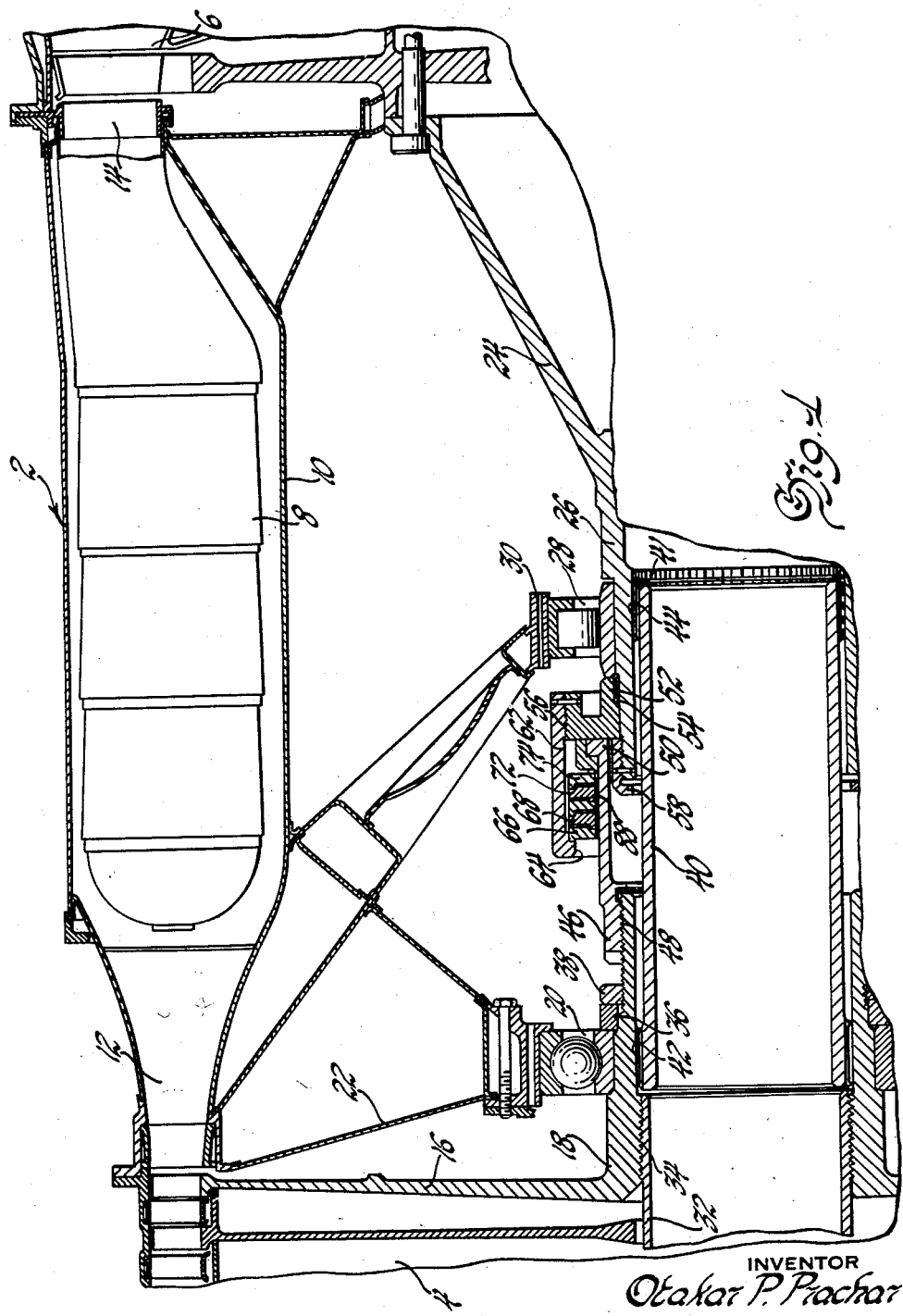

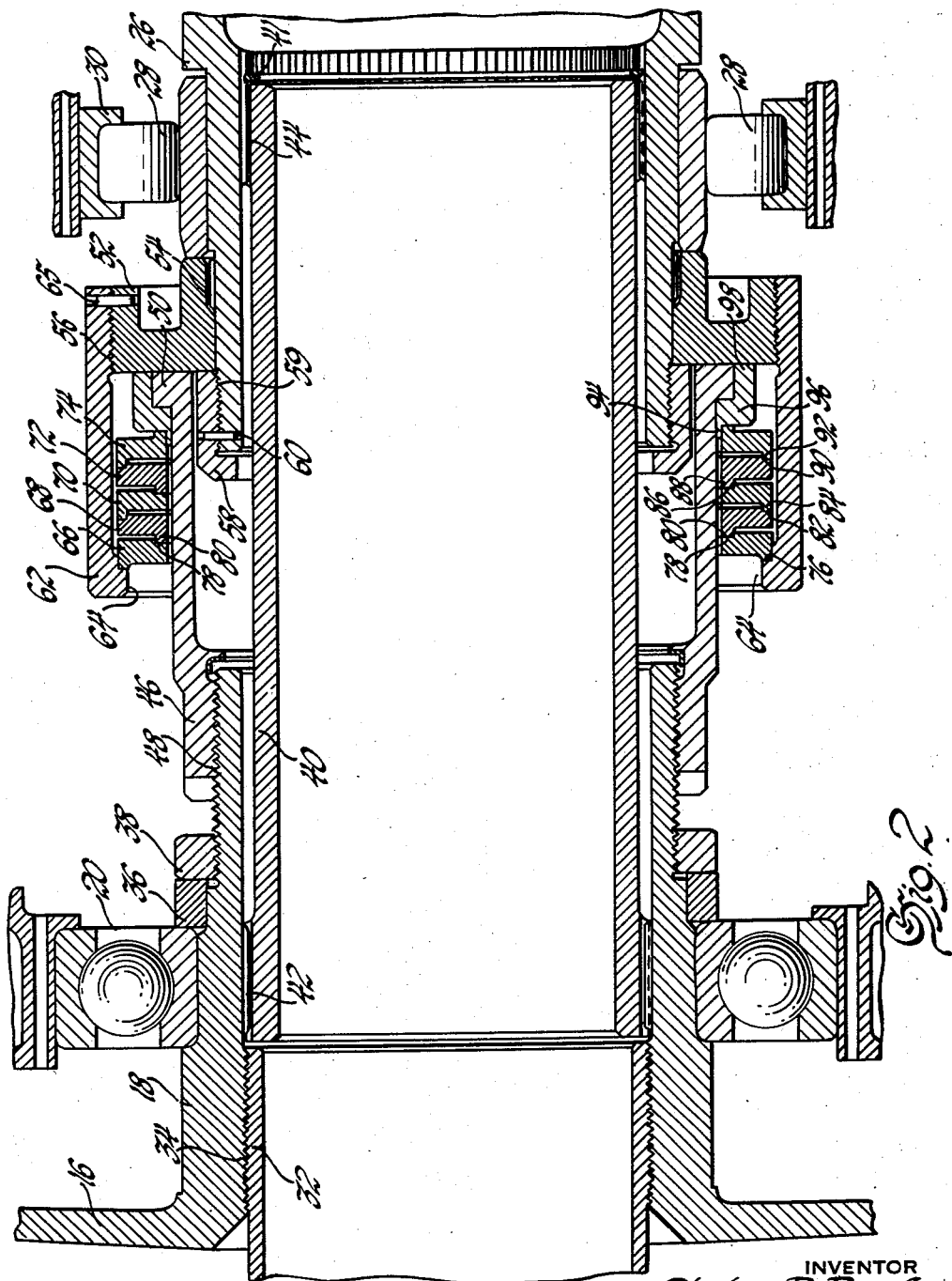

2,864,244

FLEXIBLE COUPLING

Otakar P. Prachar, Indianapolis, Ind., assignor to General Motors Corporation, Detroit, Mich., a corporation of Delaware Application December 21, 1954, Serial No. 476,693

10 Claims. (Cl. 64—9)

This invention relates to a flexible coupling and more particularly to a flexible coupling permitting axial misalignment and capable of taking axial thrust loads.

The flexible coupling of this invention transmits torque and is capable of transmitting thrust loads between driving and driven members. The coupling also permits axial misalignment between the driving and driven members.

In the preferred embodiment of this invention, a splined sleeve coupling the driving member to the driven member transmits torque and permits a certain amount of angular misalignment. The driving member supports an axial sleeve having a radially inwardly extending peripheral flange and the driven member supports an axial sleeve fitting within the driving member sleeve and having a radially outwardly extending peripheral flange. A number of interfitting flexible disks located between the sleeves receive axial thrust loads from the radial flange of the driving member sleeve and this thrust is then transmitted by the driven member sleeve to a thrust bearing on the driven member. The axial thrust of the driven member is taken by the thrust bearing. The disks are interfitting to prevent lateral displacement of the disks relative to each other due to axial misalignment.

An object of this invention is to provide a flexible coupling transmitting torque between driving and driven members and capable of taking axial thrust loads. Another object of this invention is to provide a flexible coupling transmitting torque between driving and driven members subject to angular misalignment and capable of taking axial thrust loads. A more specific object of this invention is to provide a flexible coupling transmitting torque between driven and driving members subject to angular misalignment and including a number of interfitting flexible disks capable of taking axial thrust loads from the driving member and transmitting this thrust to thrust accepting mechanism.

These and other objects of this invention will be readily apparent from the following specification and drawings, in which:

Figure 1 is a partial sectional view of a gas turbine engine embodying the flexible coupling of this invention; and Figure 2 is an enlarged view of a part of Figure 1 showing the flexible coupling of this invention.

Referring now to Figure 1, a gas turbine engine 2 includes a compressor 4, a turbine 6, and combustors 8 supported within an annular chamber 10 of the engine. Compressed air from the compressor enters chamber 10 through a diffuser 12 and the resultant products of combustion from combustors 8 are discharged through turbine nozzle 14 to the turbine which drives the compressor. The compressor rotor end disk 16 includes a hub 18 supported in thrust bearing 20 mounted in structural members 22 of the engine frame. The turbine rotor shaft 24 has hub 26 supported in roller bearing 28 mounted in structural member 30 of the engine frame.

The compressor rotor shaft or tie bolt 32 is threaded into the compressor hub portion 18 at 34. A retaining ring 36 held in place by nut 38 locates the thrust bearing on the compressor hub.

A sleeve 40 splined to hub 18 at 42 and to hub 26 at 44 transmits torque from the turbine to the compressor. The splined connections permit a certain amount of angular misalignment between the turbine and compressor and allow the compressor to be driven by the turbine despite this misalignment. Axial movement of the sleeve is limited by split ring 41 seated in a groove in hub 26 and by the end of shaft or tie bolt 32.

The turbine and compressor develop opposed axial thrusts tending to pull apart the turbine and compressor. Bearing 20 is the only thrust bearing in the engine capable of accepting these thrusts, for bearing 28 is a roller bearing and cannot take axial thrusts. Bearing 20 accepts the axial thrust of the compressor, and the coupling arrangement between the turbine and compressor must therefore be able to receive the axial thrust of the turbine and transmit this thrust to the thrust bearing. This invention provides such a coupling arrangement including the splined sleeve 40 to transmit torque between the turbine and compressor. Bearing 20 is located on the compressor because the compressor has smaller design tolerances and therefore must be more accurately located than the turbine. The operating temperature of the compressor is also lower than that of the turbine.

Figure 2 is an enlarged view of the coupling arrangement of this invention. Referring now to this figure, a sleeve 46 threaded on hub 18 at 48 has a peripheral flange 50. A collar 52 splined to hub 26 at 54 seats against the inner race of bearing 28 and has a threaded outer surface 56. Flanged nut 58 threaded on the terminal portion 59 of hub 26 retains collar 52 in place. The nut is locked by tapered pins 60 in tapered bores in the nut and hub. Sleeve 62 threaded on surface 56 of collar 52 has an inwardly extending flange 64 and is locked by tapered pins 65 in tapered bores in the sleeve and collar. A number of interfitting flexible spring disks 66, 68, 70, 72, and 74, located between sleeves 46 and 62, transmit the axial thrust from the turbine rotor to the compressor rotor. Terminal disk 66 has a flange 76 bearing against flange 64 and a groove 78 on the opposite surface of the disk. Disk 68 has a flange 80 fitting within groove 78 and a groove 82 on the opposite surface of the disk. The next disk 70, having flange 84 fitting in groove 82 and groove 86 on the opposite surface of the disk is of the same shape as disk 66. The succeeding disk 72 having flange 88 fitting in groove 86 and groove 90 on the opposite surface of the disk is the same shape as disk 68. Terminal disk 74 has flange 92 fitting within groove 90 and flange 94 on the opposite surface of the disk bearing against flange 96 of sleeve 98. Flange 96 fits between disk 74 and flange 50 of sleeve 46 and has a peripheral flange fitting between sleeve 46 and disk 74.

It will be noted that sleeves 46 and 98 bear against collar 52 secured to turbine hub 26 and that the remainder of the flexible disks other than the terminal disks 66 and 74 are spaced from the sleeves. Sleeves 46 and 62 rotate with the compressor and turbine and the axial thrust of the turbine holds the disks in tight fitting relationship so that they rotate as a unit with the sleeves and do not have rotational sliding movement relative to each other. The disks are interfitting to prevent lateral movement of the disks relative to each other due to axial misalignment. The disks permit a certain amount of angular misalignment between the turbine and compressor but prevent axial misalignment by their interfitting relationship. In the event of angular misalignment, the disks become dished in the area where horizontal planes through the axes of the shafts form an included angle of less than 180°.

The operation of the flexible coupling will now be described and in all instances torque is transmitted from the turbine to the compressor by sleeve 40. The turbine axial thrust is to the right, and the compressor axial thrust to the left is compensated by thrust bearing 20. The turbine thrust is transmitted to the flexible disks by flange 64 of sleeve 62 bearing against flange 76 of disk 66, and this thrust is transmitted to bearing 20 by flange 94 of disk 74 bearing against flange 96 of sleeve 98 which bears against flange 50 of sleeve 46 secured to the compressor hub 18.

The flexible coupling of this invention has been shown and described in a gas turbine engine, but it obviously has use in other installations wherein the driving and driven members exert opposed axial thrusts and it is desired to take up these thrusts. Suitable thrust accepting mechanism other than the thrust bearing shown herein may also be used. The dual functions of this flexible coupling of transmitting torque between driving and driven members subject to misalignment and receiving axial thrust loads and transmitting these loads to thrust accepting mechanism will find particular adaptation to high speed installations.

While a specific embodiment of this invention has been shown and described, various changes and modifications may be made within the scope and spirit of the invention.

I claim:

1. A flexible coupling for rotating members comprising, a first annular member supported by one of said rotating members, a second annular member supported by the other of said rotating members in radially opposed spaced relationship to said first annular member, torque transmitting means interconnecting said rotating members and permitting axial misalignment therebetween and between said annular members, and axially flexible annular disk means positioned in the annular space between said annular members and operatively interconnecting said annular members for receiving axial thrust from one of said members under all degrees of axial misalignment therebetween.

2. A flexible coupling for rotating members comprising, a first annular member supported by one of said rotating members, a second annular member supported by the other of said rotating members in radially opposed spaced relationship to said first annular member, torque transmitting means interconnecting said rotating members and permitting axial misalignment therebetween and between said annular members, and axially flexible resilient means including a number of axially positioned flexible disks positioned in the annular space between said annular members and operatively interconnecting said annular members for receiving axial thrust from one of said members under all degrees of axial misalignment therebetween, said disks being in radially spaced relationship to said annular members to permit said disks to axially flex upon receiving said axial thrust when said annular members are axially misaligned.

3. A flexible coupling for rotating members comprising, a first annular member supported by one of said rotating members and having a laterally extending flanged portion, a second annular member supported by the other of said rotating members in radially opposed spaced relationship to said first annular member and having a laterally extending flanged portion in opposed axial spaced relationship to said flange portion on said first annular member, torque transmitting means interconnecting said rotating members and permitting axial shifting movement and axial misalignment therebetween and between said annular members, and axially flexible resilient means positioned in the annular space between said annular members and operatively interconnecting said flanged portions under all degrees of axial misalignment therebetween for receiving axial thrust tending to pull together said flanged portions and axially separate said annular members.

4. A flexible coupling for rotating members comprising, a first annular member supported by one of said rotating members and having a laterally extending flanged portion, a second annular member supported by the other of said rotating members in radially opposed spaced relationship to said first annular member and having a laterally extending flanged portion in opposed axial spaced relationship to said flanged portion of said first annular member, torque transmitting means in radially spaced relationship to said first and second annular members for operatively interconnecting said rotating members and permitting axial misalignment and shifting movement therebetween and between said annular members, and axially flexible resilient means positioned in the annular space between said annular members and including a number of axially positioned axially flexible disks operatively interconnecting said opposed flange portions thereof under all degrees of axial misalignment therebetween, said resilient means receiving axial thrust from one of said annular members tending to pull together said flanged portions and axially separate said members to thereby hold said disks in tight-fitting relationship.

5. A flexible coupling for rotating members comprising, a first annular member supported by one of said rotating members and having a laterally extending flanged portion, a second annular member supported by the other of said rotating members in radially spaced relationship to said first annular member and having a laterally extending flanged portion in axially opposed spaced relationship to said flanged portion of said first annular member, torque transmitting means interconnecting said members and permitting axial misalignment and shifting movement therebetween and between said annular members, and resilient means positioned in the annular space between said annular members and including a number of axially positioned interfitting flexible disks operatively interconnecting said flanged portions thereof under all degrees of axial misalignment therebetween for receiving axial thrust from one of said members tending to pull together said flanged portions and axially separate said annular members to thereby hold said disks in tight-fitting relationship, said disks being in radially spaced relationship to said annular members to permit said disks to flex upon receiving axial thrust under misalignment conditions.

6. A flexible coupling for rotating members comprising, a first axially extending sleeve supported by one of said rotating members and having a laterally extending flanged portion, a second axially extending sleeve supported by the other of said rotating members in radially spaced telescopic relationship to said first sleeve and having a laterally extending flanged portion in axially opposed spaced relationship to said flanged portion on said first sleeve, torque transmitting means interconnecting said rotating members and permitting axial misalignment and shifting movement therebetween and between said sleeves, and resilient means positioned in the annular space between said sleeves and including a number of axially positioned axially flexible disks operatively interconnecting said flanged portions under all degrees of axial misalignment between said sleeves for receiving axial thrusts from one of said sleeves tending to pull together said flanged portions and separate said rotating members, thrust accepting means on one of said rotating members, said flexible disks transmitting said axial thrust to said thrust accepting means.

7. A flexible coupling for rotating members comprising, a first axially extending sleeve supported by one of said rotating members and having a radially extending flanged portion, a second axially extending sleeve supported by the other of said rotating members in radially spaced telescopic relationship to said first sleeve and having a radially extending flanged portion in axial opposed spaced relationship to said flanged portion on said first sleeve, torque transmitting means interconnecting said rotating members and permitting axial misalignment therebetween and between said sleeves, resilient means positioned between said sleeves and including a number of axially positioned axially flexible disks in radially spaced relationship to said sleeves and operatively interconnecting said flange portions thereof under all degrees of axial misalignment therebetween, said disks receiving axial thrust from one of said sleeves tending to pull together said flanged portions and separate said rotating members to thereby hold said disks in tight-fitting relationship, thrust accepting means on one of said rotating members, said disks transmitting said axial thrust to said thrust accepting means through said sleeve supported by said rotating member having said thrust accepting means thereon.

8. A flexible coupling for rotating members comprising, a first annular member supported by one of said rotating members, a second annular member supported by the other of said rotating members in radially opposed spaced relationship to said first annular members, torque transmitting means interconnecting said rotating members and permitting axial misalignment therebetween and between said annular members, resilient means positioned in the annular space between said annular members and including a number of axially positioned axially flexible disks operatively interconnecting said annular members for receiving axial thrusts from one of said rotating members tending to pull apart said rotating members, and means limiting the lateral displacement of opposed disks relative to each other and locating said opposed disks in axially spaced relationship to each other to permit said disks to axially flex upon receiving axial thrust under misalignment conditions.

9. A flexible coupling for rotating members comprising, a first axially extending sleeve supported by one of said rotating members, a second axially extending sleeve supported by the other of said rotating members in radially spaced telescopic relationship to said first sleeve, torque transmitting means interconnecting said members and permitting axial misalignment therebetween and between said sleeves, resilient means positioned between said sleeves and including a number of axially positioned axially flexible disks operatively interconnecting said sleeves for receiving axial thrust from one of said sleeves tending to pull apart said sleeves and thereby hold said disks in tight-fitting relationship, and means limiting the lateral displacement of opposed disks relative to each other and locating said opposed disks in axially spaced relationship to each other to permit said disks to axially flex upon receiving said axial thrust under misalignment conditions, said means including interfitting means adjacent the peripheries of each opposing disk.

10. A flexible coupling for rotating members comprising, a first axially extending sleeve supported by one of said rotating members and having a laterally extending flanged portion, a second axially extending sleeve supported by the other of said rotating members in radially spaced telescopic relationship to said first sleeve and having a laterally extending flanged portion in axially opposed spaced relationship to said flange portion on said first sleeve, torque transmitting means interconnecting said rotating members and permitting axial misalignment therebetween and between said sleeves, resilient means positioned in the annular space between said sleeves and including a number of axially positioned axially flexible disks operatively interconnecting said flanged portions for receiving axial thrust from one of said sleeves tending to pull together said flange portions and thereby hold said disks in tight-fitting relationship, and means limiting lateral displacement of opposed disks relative to each other and locating said opposed disks in axial spaced relationship to each other and to said sleeves to permit said disks to axially flex upon receiving axial thrust under misalignment conditions, said means including diagonally opposed axially extending interfitting flanges and grooves on opposite faces of each opposing disk.

References Cited in the file of this patent

UNITED STATES PATENTS

| | | |
|---|---|---|
| 2,423,568 | Slowig | July 8, 1947 |
| 2,453,964 | Betz | Nov. 16, 1948 |
| 2,576,069 | Hoag et al. | Nov. 20, 1951 |

FOREIGN PATENTS

| | | |
|---|---|---|
| 749,550 | France | May 8, 1933 |